(12) United States Patent
Tav et al.

(10) Patent No.: US 12,443,460 B2
(45) Date of Patent: Oct. 14, 2025

(54) PERFORMANCE ANALYSIS AND ROOT CAUSE IDENTIFICATION FOR CLOUD COMPUTING

(71) Applicant: International Business Machines Corporation, Armonk, NY (US)

(72) Inventors: Doga Tav, Fredericton (CA); Matthew de Souza, Kanata (CA); Alpha Barry, Gatineau (CA); Geoffrey Tate, Ottawa (CA); Nick Antonov, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 18/046,613

(22) Filed: Oct. 14, 2022

(65) Prior Publication Data

US 2024/0126614 A1    Apr. 18, 2024

(51) Int. Cl.
*G06F 9/50* (2006.01)
*G06F 11/34* (2006.01)

(52) U.S. Cl.
CPC ............ *G06F 9/505* (2013.01); *G06F 9/5077* (2013.01); *G06F 11/3495* (2013.01)

(58) Field of Classification Search
CPC ..... G06F 9/505; G06F 9/5077; G06F 11/3495
See application file for complete search history.

(56) References Cited

U.S. PATENT DOCUMENTS

| | | |
|---|---|---|
| 10,171,565 B2 | 1/2019 | Moon et al. |
| 10,303,576 B1 | 5/2019 | Seymour et al. |
| 2011/0283266 A1 | 11/2011 | Gallagher et al. |
| 2016/0337215 A1 | 11/2016 | Wunderlich et al. |

(Continued)

FOREIGN PATENT DOCUMENTS

| | | |
|---|---|---|
| CN | 114816914 A | 7/2022 |
| EP | 2616931 B1 | 7/2013 |
| TW | 202416126 A | 4/2024 |

OTHER PUBLICATIONS

"Flame Graphs Visualize Profiled Code"; Retrieved Online from https://github.com/brendangregg/FlameGraph on Jul. 28, 2022; 9 Pages.

(Continued)

*Primary Examiner* — Sisley N Kim
(74) *Attorney, Agent, or Firm* — CANTOR COLBURN LLP; Stosch Sabo

(57) ABSTRACT

Examples described herein provide a computer-implemented method that includes, in response to receiving a request against the workload in an environment comprising predetermined cloud-based containers, searching predetermined container runtime interface metadata across a plurality of compute nodes in the environment to locate runtime processes. The method further includes selecting, for each runtime process located, a respective applicable profiler from a set of predetermined profilers sharing a transactional database. The method further includes injecting, for each runtime process located, predetermined code libraries for each respective applicable profiler. The method further includes re-linking the predetermined code libraries for each respective applicable profiler. The method further includes executing, for each runtime process located, each respective applicable profiler to produce a set of results.

14 Claims, 13 Drawing Sheets

(56) References Cited

U.S. PATENT DOCUMENTS

2016/0357655 A1    12/2016    Mukai
2022/0365750 A1*  11/2022    Bharambe ............... G06F 7/485
2025/0208911 A1*   6/2025    Ding ..................... G06F 9/5077

OTHER PUBLICATIONS

"gProfiler"; Retrieved Online from https://github.com/Granulate/gprofiler on Jul. 28, 2022; 17 Pages.

"Kubectl Plugin for Effortless Profiling on Kubernetes"; Kubectl Flame; Retrieved Online from https://github.com/yahoo/kubectl-flame on Jul. 28, 2022; 4 Pages.

"py-spy: Sampling Profiler for Python Programs"; Retrieved Online from https://github.com/benfred/py-spy on Jul. 28, 2022; 8 Pages.

Yamamoto et al.; "Unified Performance Profiling of an Entire Virtualized Environment"; International Journal of Networking and Computing—www.ijnc.org; ISSN 2185-2839 (Print) ISSV 2185-2547 (Online); vol. 6, No. 1; Jan. 2016; pp. 124-147.

Zaslavskiy et al.; "Lightweight Linux Dynamic Libraries Profiling Technique for Embedded Systems"; CEE-SECR; Oct. 23-25, 2013; 6 Pages.

IBM—"Container monitoring", IBM owned Instana, 14 pages, May 12, 2025, https://www.instana.com/apm-for-containers/.

Kubernetes Monitoring, "What is Kubernetes and how should you monitor it?", NewRelic, 18 p. May 12, 2025, https://newrelic.com/platform/kubernetes/monitoring-guide.

New Relic, "Auto-telemetry with Pixie for instant Kubernetes observability", 05 pages, May 12, 2025, https://docs.newrelic.com/docs/kubernetes-pixie/auto-telemetry-pixie/get-started-auto-telemetry-pixie/.

New Relic, "Real-time profiling for Java using JFR metrics", 06 pages, May 12, 2025, https://docs.newrelic.com/docs/apm/agents/java-agent/features/real-time-profiling-java-using-jfr-metrics/.

Sysdig Monitor—"Radically Simplified Monitoring", IBM partner SysDig, 11 pages, May 12, 2025, https://sysdig.com/products/monitor/.

* cited by examiner

PERFORMANCE ANALYSIS AND ROOT CAUSE IDENTIFICATION FOR CLOUD COMPUTING

BACKGROUND

Embodiments described herein generally relate to processing systems, and more specifically, to performance analysis and root cause identification for cloud computing.

Performance analysis and root cause identification is a useful tool in software engineering. Performance analysis and root cause identification involves evaluating software to identify an origin of a problem, which can include identifying possible causes and ultimately, the actual cause, of the problem. In cloud environments, current software design methodologies involve building a large number of coordinating and cooperating microservices. Such methodologies can further involve dynamic scaling and/or a transitory state and unknown lifecycle.

SUMMARY

In one exemplary embodiment, a computer-implemented method for unified performance profiling of a workload is provided. The method includes, in response to receiving a request against the workload in an environment comprising predetermined cloud-based containers, searching predetermined container runtime interface metadata across a plurality of compute nodes in the environment to locate runtime processes. The method further includes selecting, for each runtime process located, a respective applicable profiler from a set of predetermined profilers sharing a transactional database. The method further includes injecting, for each runtime process located, predetermined code libraries for each respective applicable profiler. The method further includes re-linking the predetermined code libraries for each respective applicable profiler. The method further includes executing, for each runtime process located, each respective applicable profiler to produce a set of results. This embodiment provides for efficiently identifying root causes within the workload and provides a unified mechanism across multiple programming languages used in the environment.

In addition to one or more of the features described herein, or as an alternative, further embodiments of the method may include persisting the set of results in a repository. This embodiment provides for maintaining the results for archival purposes.

In addition to one or more of the features described herein, or as an alternative, further embodiments of the method may include generating, based on the set of results, a graphical interface, and displaying the graphical interface to a user. This embodiment provides for displaying information to the user about the profilers.

In addition to one or more of the features described herein, or as an alternative, further embodiments of the method may include that the graphical interface displays information about each respective applicable profiler. This embodiment provides for displaying information to the user about the profilers.

In addition to one or more of the features described herein, or as an alternative, further embodiments of the method may include that the graphical interface merges the information about each respective applicable profiler into unified data. This embodiment provides for displaying information to the user about the profilers and provides a unified view.

In addition to one or more of the features described herein, or as an alternative, further embodiments of the method may include that the graphical interface further displays information about an additional profiler. This embodiments provides for displaying information about an additional profiler other than each respective applicable profiler.

In another exemplary embodiment a computer-implemented method for unified performance profiling of a workload is provided. The method includes receiving a query at a Kubernetes service. The method further includes assigning, by the Kubernetes service, the query to a profiler of a plurality of profilers. The method further includes distributing, by the profiler, the query to other profilers of the plurality of profilers, wherein the plurality of profilers share a transactional database. The method further includes receiving a results request at the Kubernetes service. The method further includes assigning, by the Kubernetes service, the results request to any one of the plurality of profilers. The method further includes providing, by the one of the plurality of profilers, results responsive to the results request. This embodiment provides for efficiently profiling performance within the workload by distributing queries across profilers that share a transactional database. The transaction database provides for the profilers to see one another's data and they can profile together in parallel.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
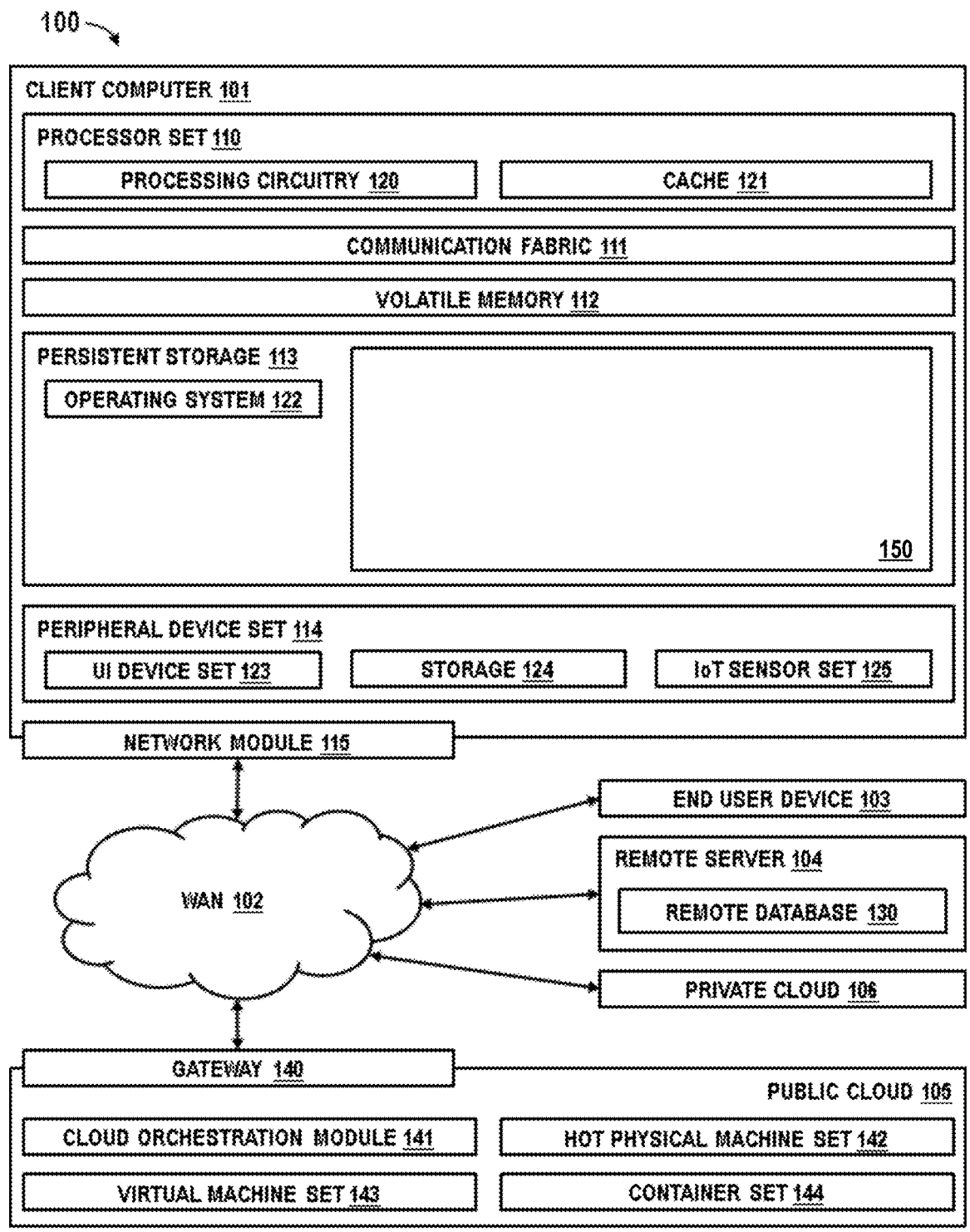
FIG. 1 depicts a block diagram of a processing system for implementing one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the described herein provide for performance analysis and root cause identification for cloud computing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as performance analysis and root cause identification for cloud computing (block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments of the described herein provide for performance analysis and root cause identification for cloud computing. For example, one or more embodiments provide software engineers to profile multiple aspects and dimensions of distributed software running in the in a cloud computing environment, to dynamically capture system state quickly, and to visualize the big picture of the software under a single unified view. One or more embodiments provides an easily consumable output while allowing users to drill down into lower levels and perform a deeper analysis as needed.

Figure 2:
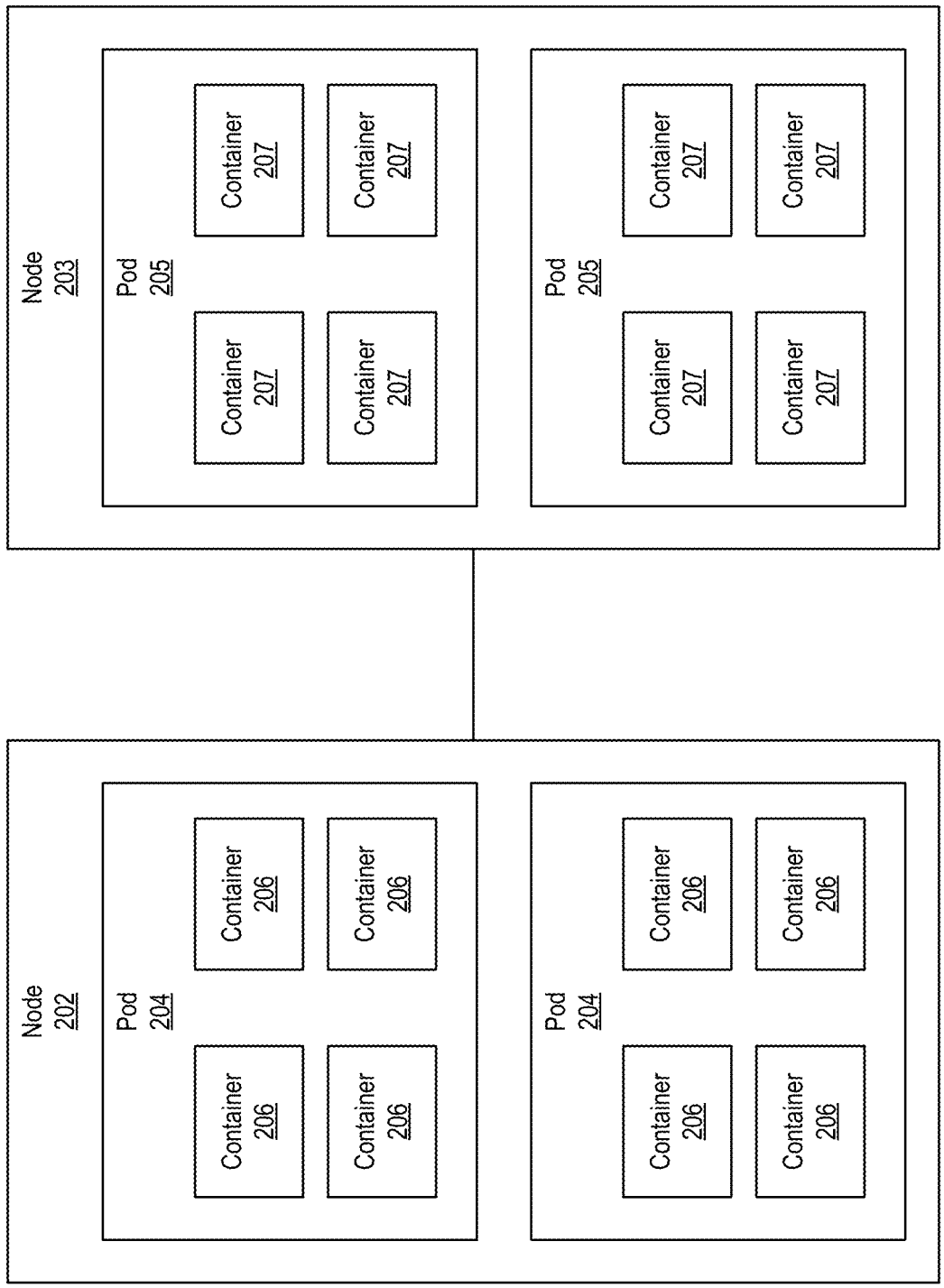
FIG. 2 depicts a block diagram of a platform environment according to one or more embodiments described herein.

FIG. 2 depicts a block diagram of a platform environment 200 according to one or more embodiments described herein. The platform environment 200 includes one or more nodes (e.g., nodes 202, 203) which are communicatively coupled. Each of the nodes includes one or more containers (e.g., the containers 206, 207), which can be cloud-based containers and can be clustered into pods (e.g., pods 204, 205). One example the platform environment 200 is RED HAT® OPENSHIFT®. In the platform environment 200, many services can be spun up, which can make it difficult to find the root cause of a problem.

To address this, a profiler can be added to each of the one or more nodes according to one or more embodiments described herein. The profiler provides for unified performance profiling. The profiler, in response to receiving a request against the workload in an environment comprising predetermined cloud-based containers, can search predetermined container runtime interface metadata across a plurality of compute nodes in the environment to locate runtime processes. Further, the profiler can select, for each runtime process located, a respective applicable profiler from a set of predetermined profilers sharing a transactional database. The profiler can inject, for each runtime process located, predetermined code libraries for each respective applicable profiler. Further, the profiler can re-link the predetermined code libraries for each respective applicable profiler. The profiler can execute, for each runtime process located, each respective applicable profiler to produce a set of results. These and other features and functions of the profiler are described in more detail herein.

One or more embodiments described herein provides for identifying root causes for product development and support teams. Incidents can be exported and recorded for archival purposes. One or more embodiments provides a unified mechanism across different programming languages in the pods in the overall platform environment. According to one or more embodiments described herein, the memory/resource used to create and run the unified mechanism poses very minimal impact on running applications in the platform environment. Therefore, the measurements taken are not hit with observability bias. One or more embodiments works with static and non-static (JIT) languages. One or more embodiments provide a backup functionality wherein when the pod is running an unknown language, a utility can be executed to obtain the stack from the language.

One or more embodiments provide for selecting a profiling tool for the language. One or more embodiments provide for translating the data from the individual profilers (e.g., each of the profilers in multiple nodes) which can be aggregated and summarized. According to one or more embodiments, the estimated usage and cost data can be included in a graphical representation/interface. For example, a sampling profiler can take samples over time of stack traces. The samples can be normalized and aggregated to identify patterns, and results can be displayed on the graphical representation. This can be referred to as a "flamegraph" which provides for presenting the different structured data in a unified way to users. Users are unaware that multiple different types of profilers can be used to produce the information included in the flamegraph. For example, a user can request that the profiler profile Java and Python in the same flamegraph. One or more embodiments can be implemented in memory without external storage or network connectivity. According to one or more embodiments, the flamegraphs are portable and interactive and can be shared across tools or support cases.

The above-described one or more embodiments address the shortcomings of the prior art by providing a simple user interface for unified performance profiling against any workload in OpenShift. One or more embodiments provide shared and unique options per Runtime Environment Language (e.g., Java, Go, Python, Node.js, Rust, C, C++, Perl, and/or the like, including combinations or multiples thereof). One or more embodiments provide the ability to profile many container processes at the same time even if they use different implementation language runtimes, which provides for processor, memory, and input/output (I/O) level profiling, essentially providing full context of the system resource usage. One or more embodiments provide the ability to provide a high-resolution system resource usage snapshot in-line with the profiler output. This provides context about the meaning of the generate flamegraph. For example, a function is statistically sampled to be in use 50% of the time on a process that is utilizing 75% of a CPU core. One or more embodiments provide the ability to perform a side-by-side performance comparison of proportional resource driven consumption utilization visualization with contextual information of multiple containers across different computing hosts in a pod (e.g., one of the pods 204, 205) that facilitates pattern recognition. One or more embodiments provides the ability to download and distribute interactive flamegraphs to developers for further optimization of code.

Figure 3:
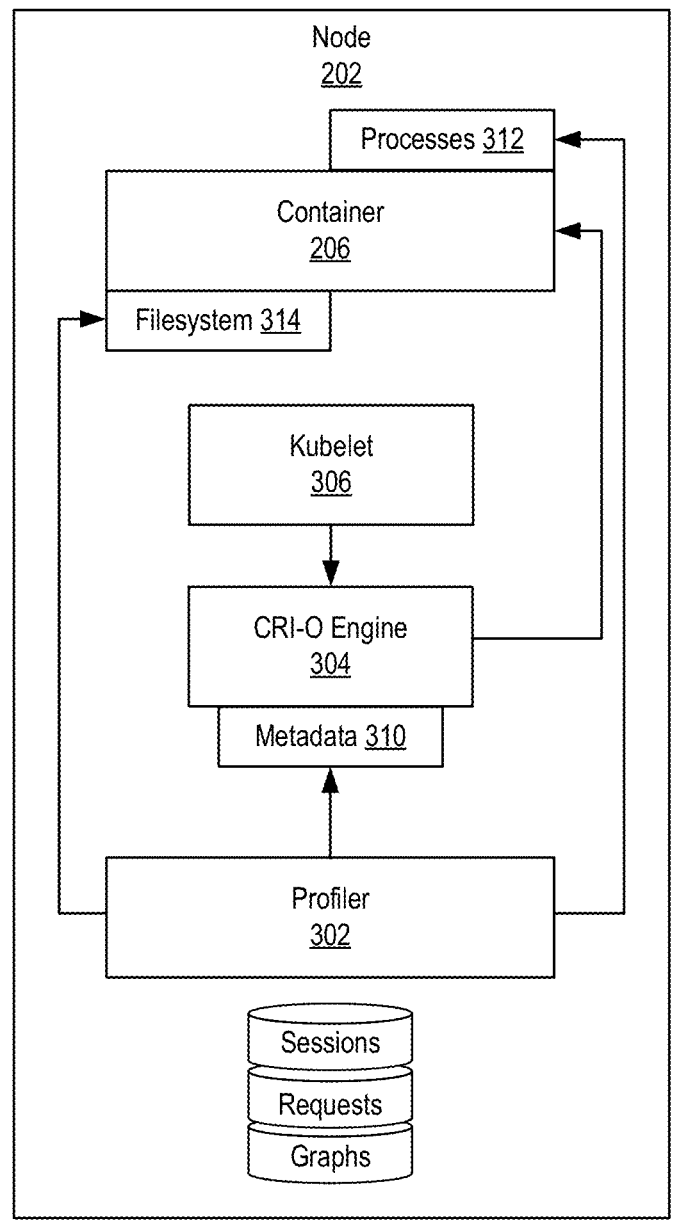
FIG. 3 depicts a block diagram of a node of the platform environment of FIG. 2, the node having a profiler, according to one or more embodiments described herein.

FIG. 3 depicts a block diagram of a node (e.g., the node 202) of the platform environment 200 of FIG. 2 according to one or more embodiments described herein. The node 202 includes the container 206, a profiler 302, a CRI-O engine 304, and a kubelet 306. The CRI-O engine 304 is an Open Container Initiative (OCI)-based implementation of a Kubernetes container runtime interface. The kubelet 306 is a node agent that runs on the node 204 and can register the node 204 with an API server ("apiserver").

This example shows that the profile 302 can reach out to the container 206 directly to obtain full real-time introspection in to the containers (e.g., the container 206) that are running. The profiler 302 can inject libraries (e.g., Linux libraries) and link them to be able to execute a profile and persist the results to be collected.

Figure 4:
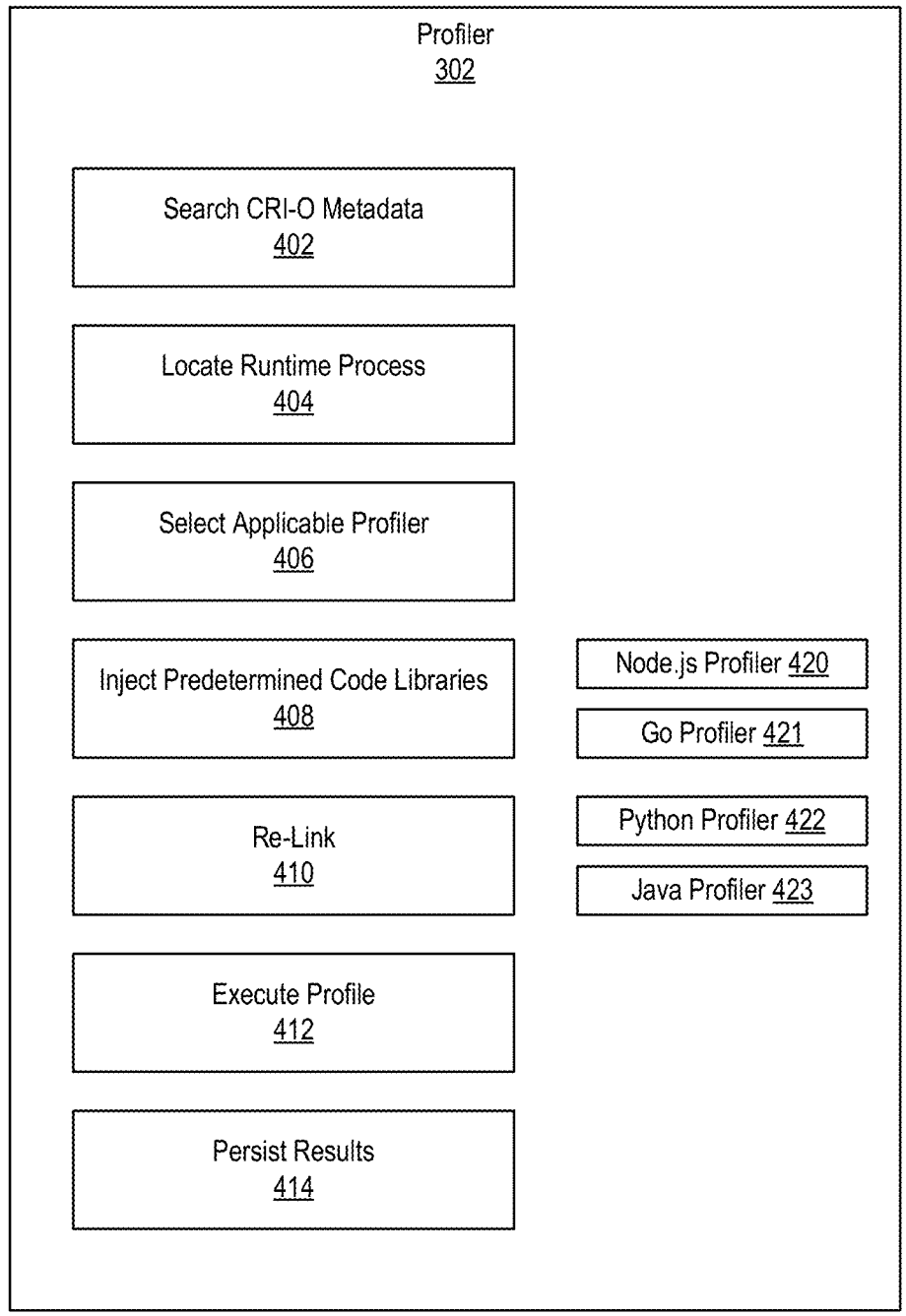
FIG. 4 depicts a functional block diagram of operations of the profiler of FIG. 3 according to one or more embodiments described herein.

To unified performance profiling of a workload, the profiler 302 performs the following, which are described with reference to FIGS. 3 and 4. At block 402, the profiler 302 searches metadata 310 of the CRI-O engine 304. At block 404, the profiler 302 locates a runtime process (e.g., one of the processes 312) executing on the container 206. At block 406, the profiler 302 selects an applicable profiler depending on the located runtime process. Examples of profilers include, but are not limited to, a Node.js profiler 420, a Go profiler 421, a Python profiler 422, and a Java profiler 423. Other types of profilers are also possible and can depend on the type of code used to build the runtime process executing on the container 206. At block 408, the profiler 302 injects predetermined code libraries (e.g., Linux libraries) for the runtime process based on the applicable profiler from block 406. At block 410, the profiler 302 re-links the predetermined code libraries for the applicable profiler from block 406. At block 412, the profiler 302 executes a profile for the applicable profiler from block 406. When executed, the profiler 302 generates a set of results. At block 414, the profiler 302 persists the results, such as for later use. For example, the results can be used to generate a flamegraph as described herein to present the different structured data (e.g., the results) in a unified way to users.

Figure 5:
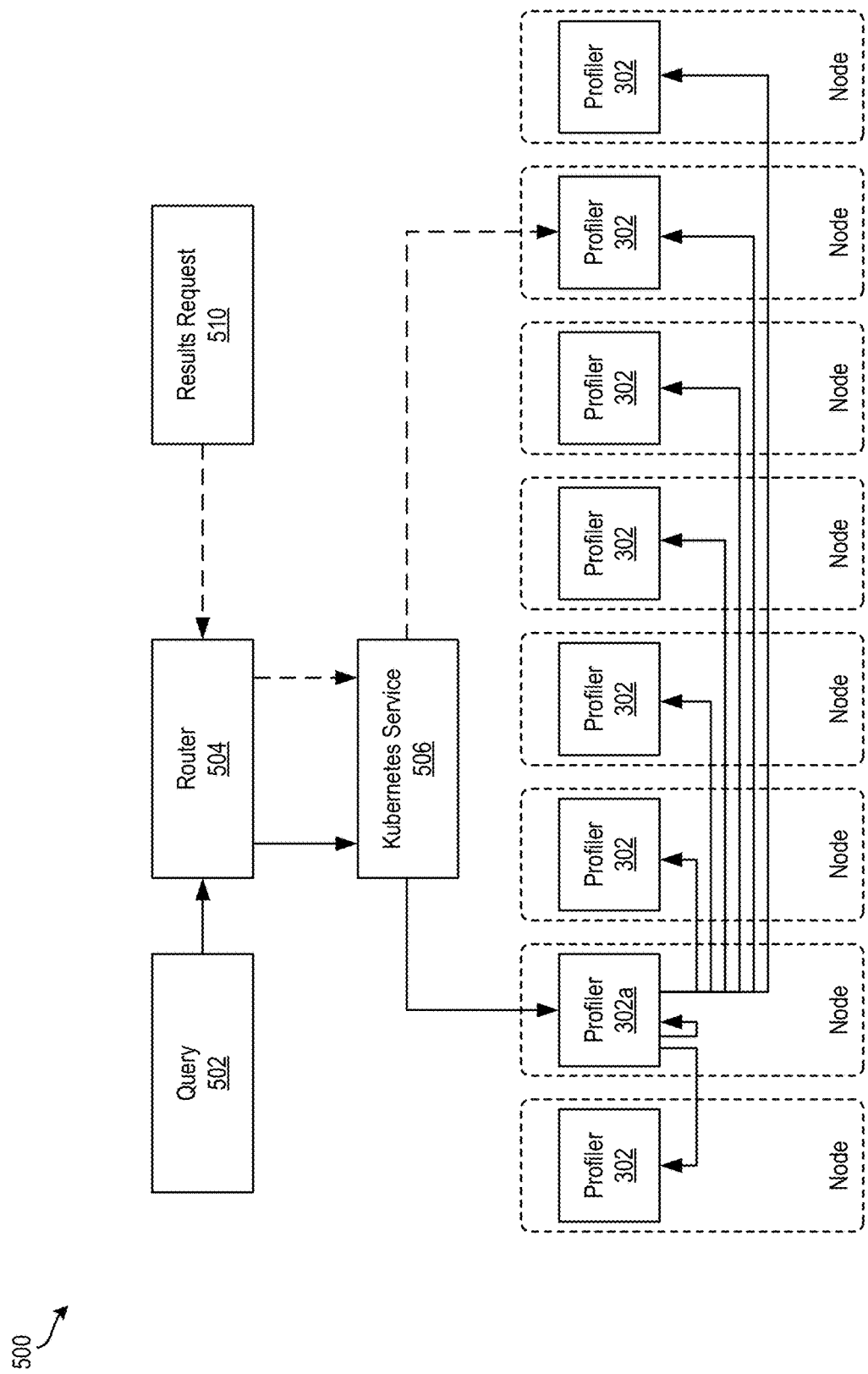
FIG. 5 depicts a block diagram for a system for distributing a query to multiple profilers according to one or more embodiments described herein.

FIG. 5 is now described, which shows a block diagram for a system 500 for distributing a query to multiple profilers according to one or more embodiments described herein. A query 502 is transmitted to a router 504 (e.g., an OpenShift router), and a Kubernetes service 506 assigns or otherwise transmits the query to a profiler (e.g., the profiler 302*a*, which is an example of the profiler 302 of FIG. 3. The Kubernetes service 506 can assign the query using a round robin approach (e.g., assigning to each profiler 302 in order), a random selection approach (e.g., randomly selecting a profiler), a load balancing approach (e.g., assigning based on a load of the profiler), and/or the like, including combinations and/or multiples thereof. The profiler 302*a* distributes the query 502 to other nodes in parallel, where each of the profilers 302 are disposed in or otherwise associated with a node (e.g., the node 202, the node 203, and/or the like, including combinations and/or multiples thereof). This provides a global view of the query to each of the profilers 302.

A user can request a root cause analysis by requesting results at block 510 ("request results"). When the results are requested at block 510, the request is sent to the router 504, and the Kubernetes service 506 reaches out to one of the profilers 302 to gather the results. Because the query 502 was distributed to each of the profilers 302, the Kubernetes service 506 can request results from any of the profilers 302 because the profilers 302 share the same global view.

Figure 6:
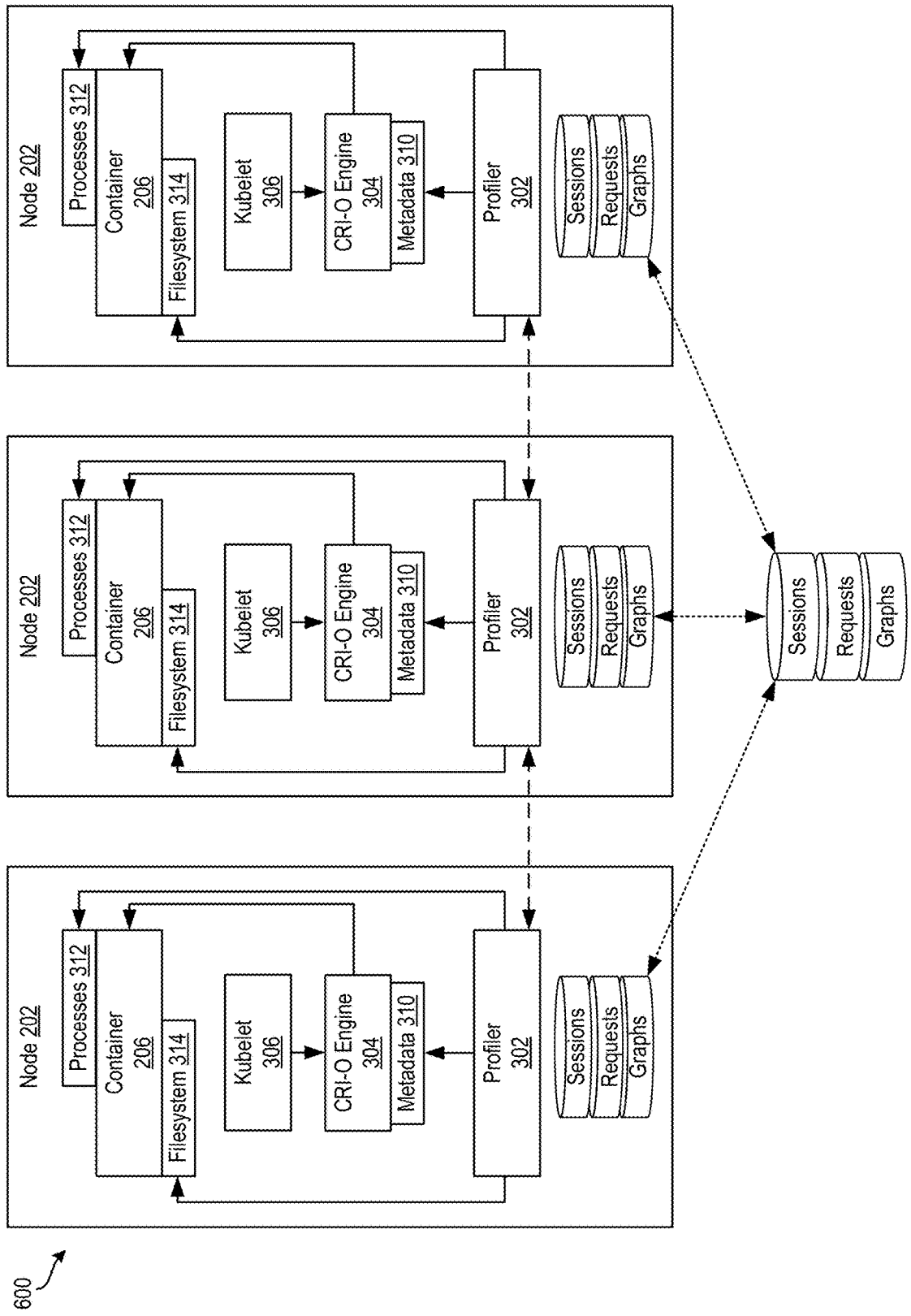
FIG. 6 depicts a system showing how the profiler is deployed and the interactions that provide for the profiler to be able to gather a unified view across nodes according to one or more embodiments described herein.
Figure 7A:
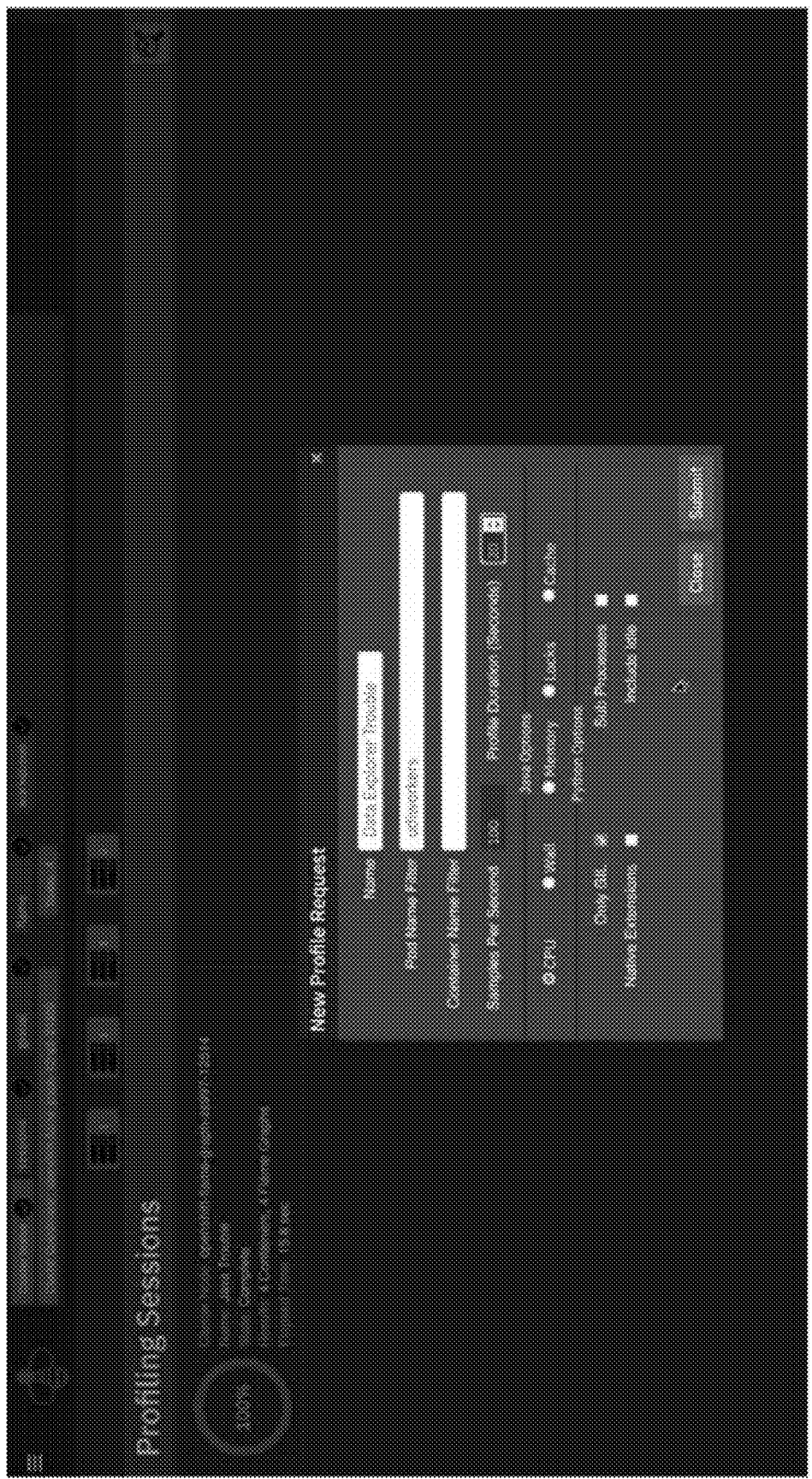
FIGS. 7A-7E depict screenshots of interfaces according to one or more embodiments described herein.
Figure 7B:
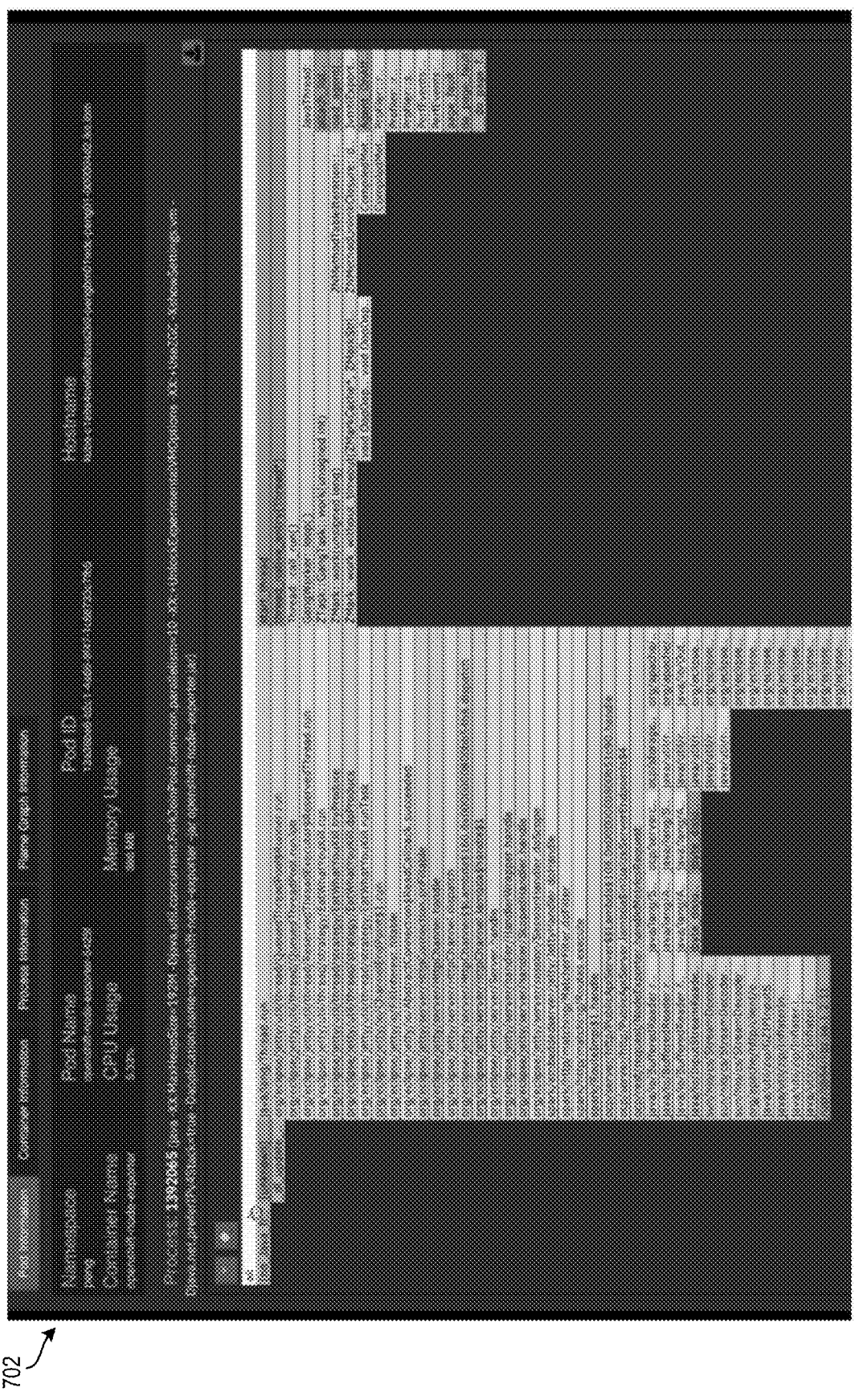
Figure 7C:
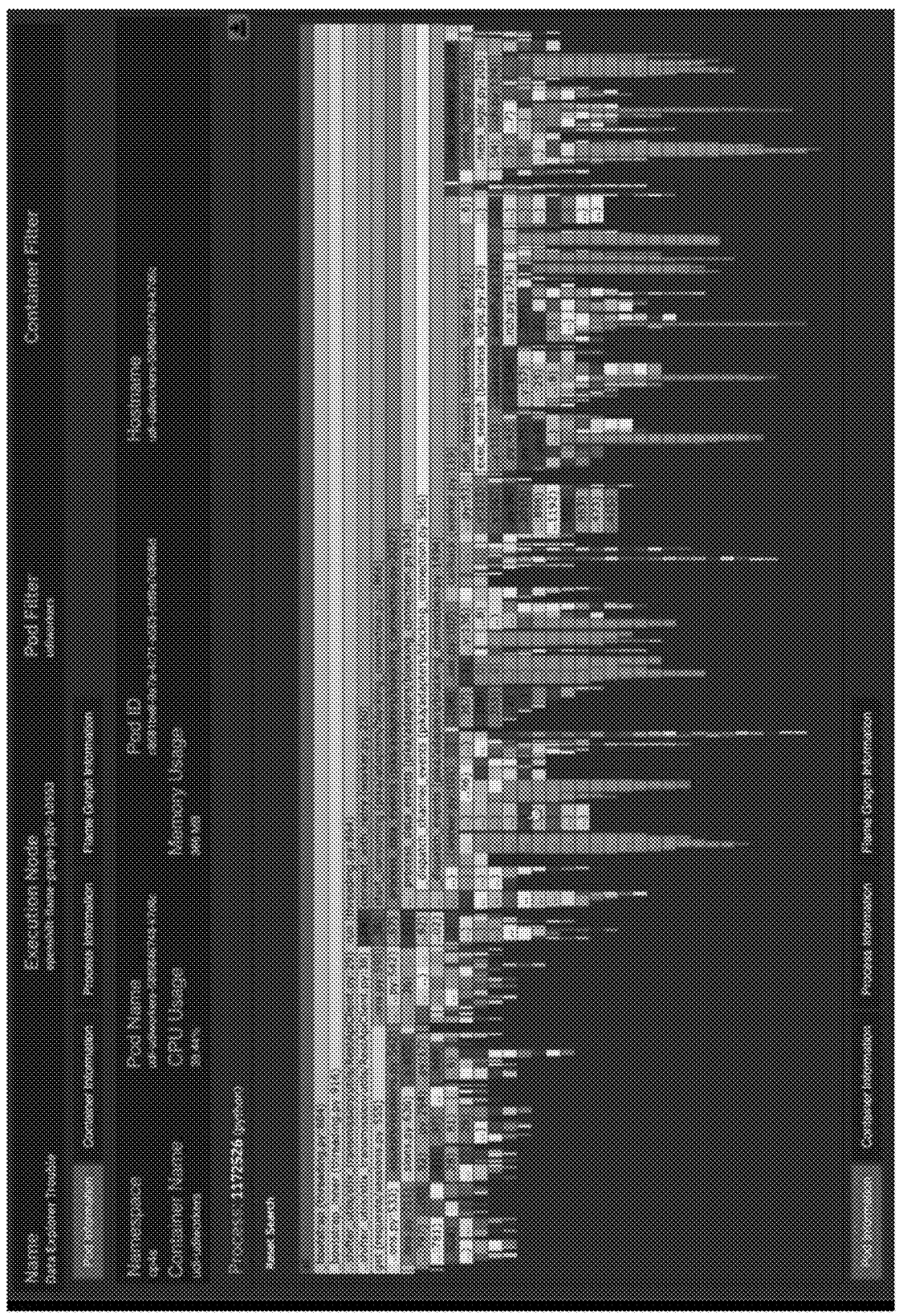
Figure 7D:
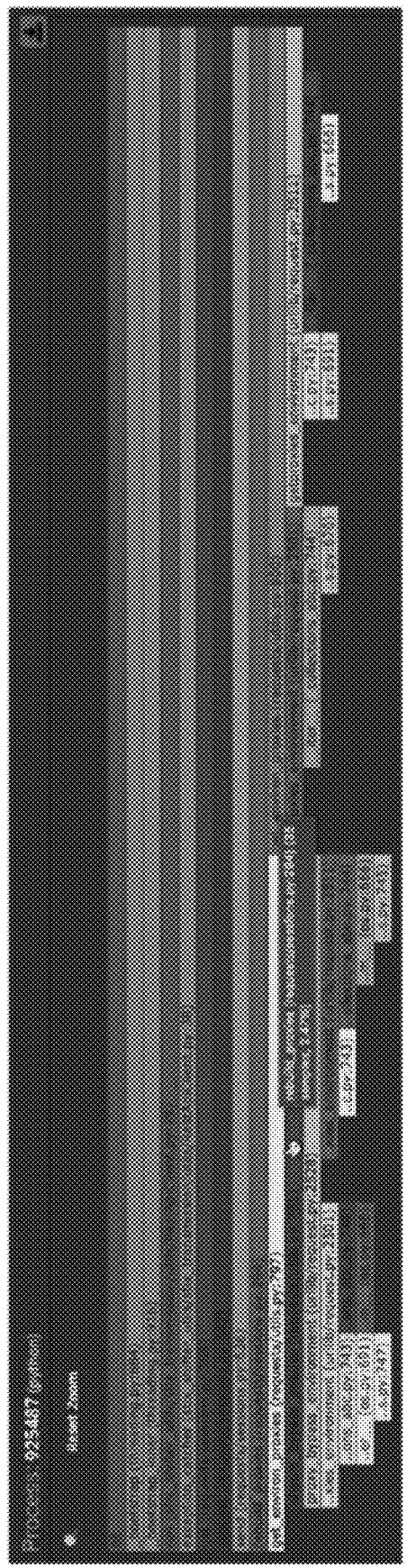
Figure 7E:
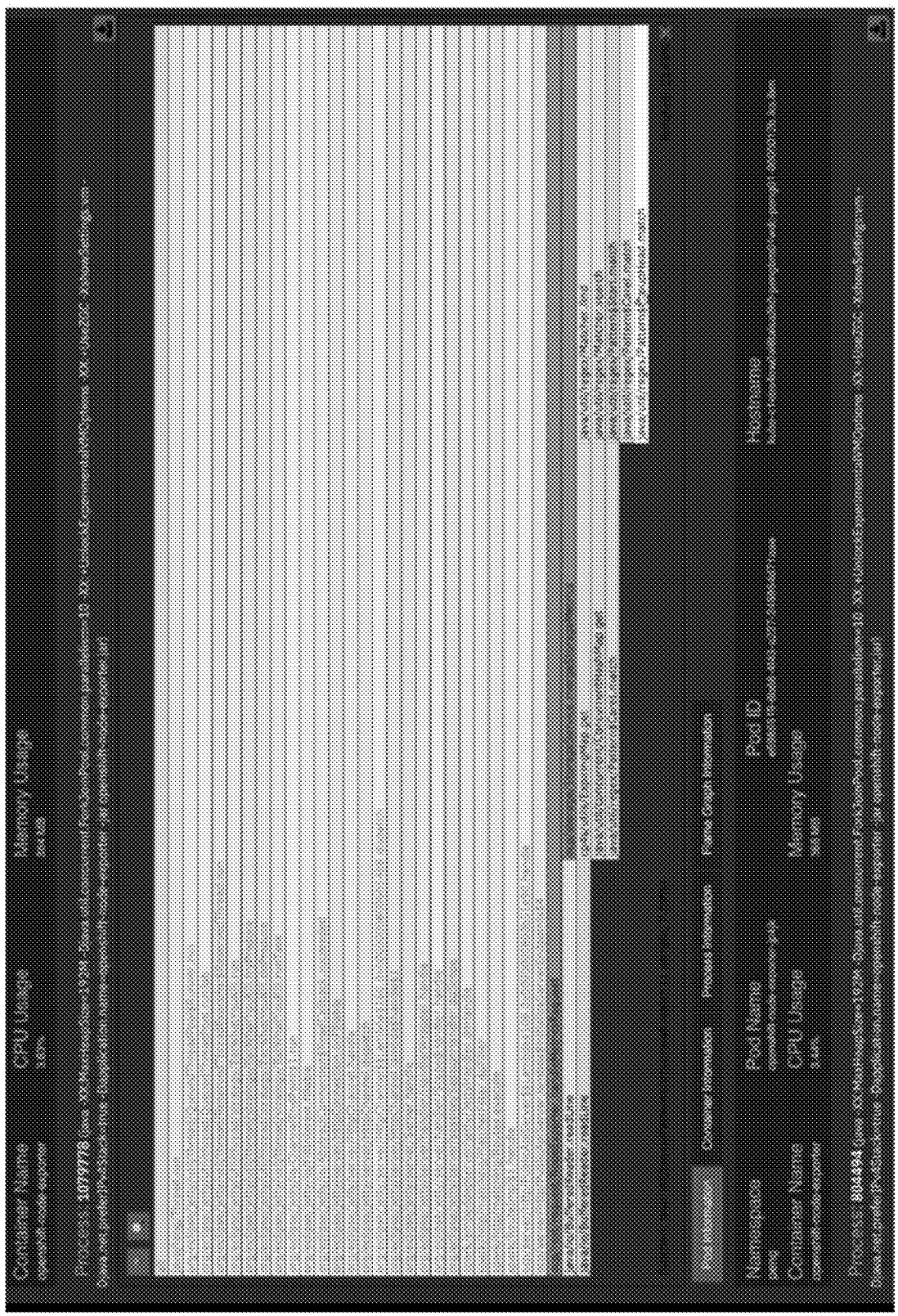

FIG. 6 depicts a system 600 showing how the profiler 302 is deployed and the interactions that provide for the profiler 302 to be able to gather a unified view across nodes according to one or more embodiments described herein. In the system 600, three nodes 202 are shown, although other numbers (e.g., more or fewer) nodes can be included in other embodiments. The nodes 202 are examples of the node 202 of FIG. 3. In the example of FIG. 6, the profilers 302 provide for transactional replication among the nodes 202. The transactional replication is performed by providing a shared transactional database so that the profilers 302 can see one another's data and they can profile together in parallel.

FIGS. 7A-7E depict screenshots of interfaces 701-705 (e.g., graphical interfaces) according to one or more embodiments described herein. One or more of the interfaces 701-705 can be a flame graph according to one or more embodiments. According to one or more embodiments, one or more of the interfaces 701-705 displays information about each respective applicable profiler. According to one or more embodiments, one or more of the interfaces 701-705 merges information about each respective applicable profiler into unified data (e.g., data that is agnostic with respect to the type of profiler). According to one or more embodiments, one or more of the interfaces 701-705 displays information about an additional profiler, which may be a generic profiler that does not rely on a particular language. In examples, multiple classes of profiles with different levels of outputs are possible.

The interface 701 provides for defining the query (e.g., the query 502 of FIG. 5). The interface 701 provides options to select in terms of memory and processor profiling, which provides for drilling down to specific pods of interest. Additionally, the sampling time and profile duration are configurable. The samples of the pods are gathered via the memory snapshot from infrastructure (e.g., OpenShift) level which significantly reduces the observability bias or profiling-hit to the running pod.

The interface 702 shows processor time spent, as a distribution (e.g., a flamegraph), in a Java process. The interface 702 shows line numbers and percentage of time spent for particular functions.

The interface 703 shows processor time spent, as a distribution (e.g., a flamegraph), in a python process. The interface 703 shows line numbers and percentage of time spent for particular functions.

The interface 704 provides for interactive drill down to interact with the flamegraph for a python process showing a number of samples and associated time weights in the overall stack.

The interface 705 shows a stack searching feature with provides for searching for specific function and calls to pinpoint areas of interest.

Figure 8:
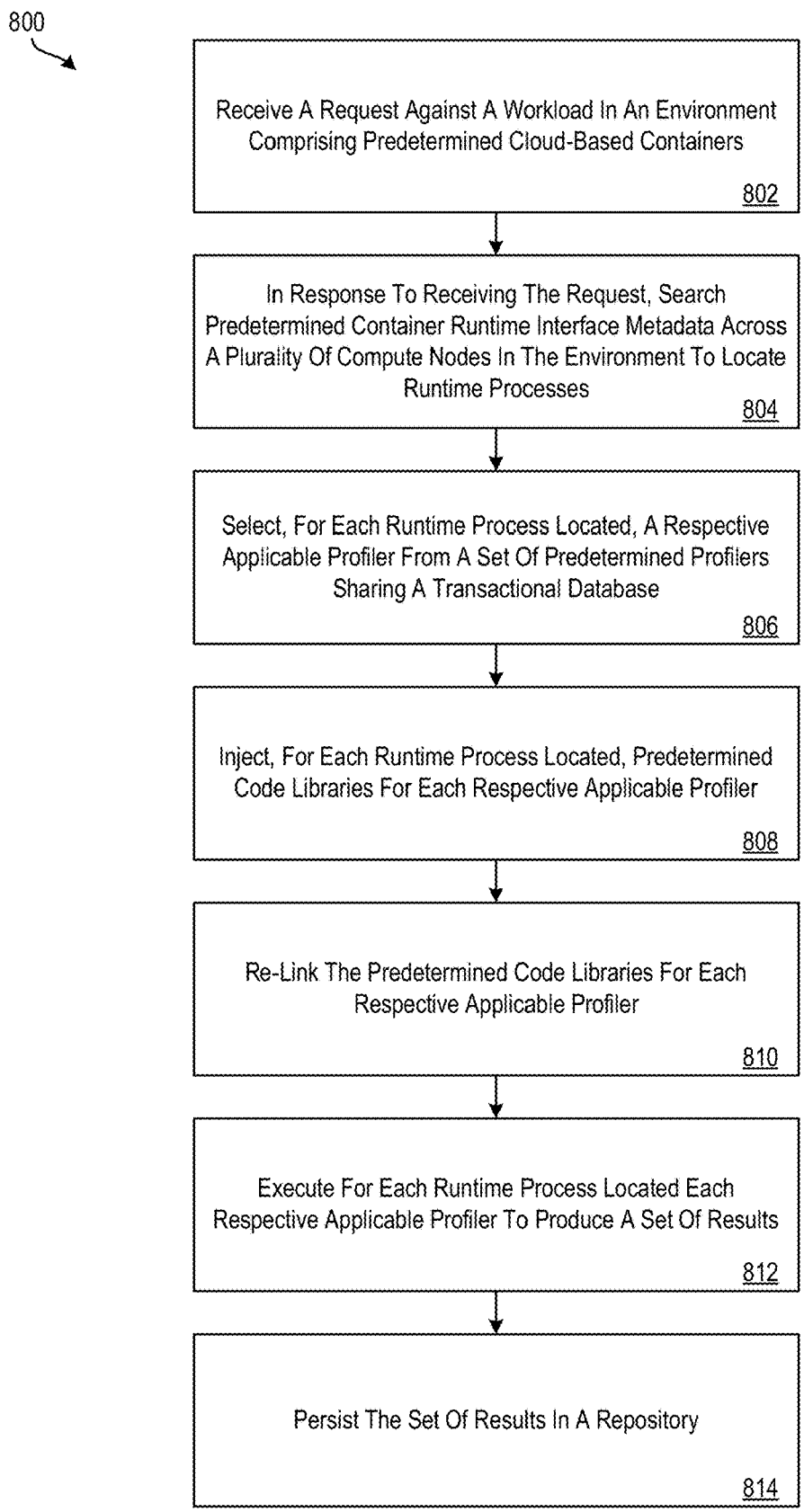
FIG. 8 depicts a flow diagram of a method for unified performance profiling of a workload according to one or more embodiments described herein.

FIG. 8 depicts a flow diagram of a method 800 for unified performance profiling of a workload according to one or more embodiments described herein. The method 800 can be performed by any suitable system or device, such as the computing environment 100, the profiler 302, and/or the like, including combinations and/or multiples thereof.

At block 802, in response to receiving a request against the workload in an environment comprising predetermined cloud-based containers, the profiler 302 searches predetermined container runtime interface metadata across a plurality of compute nodes in the environment to locate runtime processes. At block 804, the profiler 302 selects, for each runtime process located, a respective applicable profiler from a set of predetermined profilers sharing a transactional database. At block 806, the profiler 302 injects, for each runtime process located, predetermined code libraries for each respective applicable profiler. At block 808, the profiler 302 re-links the predetermined code libraries for each respective applicable profiler. At block 810, the profiler 302 executes, for each runtime process located, each respective applicable profiler to produce a set of results.

Additional processes also may be included, and it should be understood that the process depicted in FIG. 8 represents an illustration, and that other processes may be added or existing processes may be removed, modified, or rearranged without departing from the scope of the present disclosure.

Figure 9:
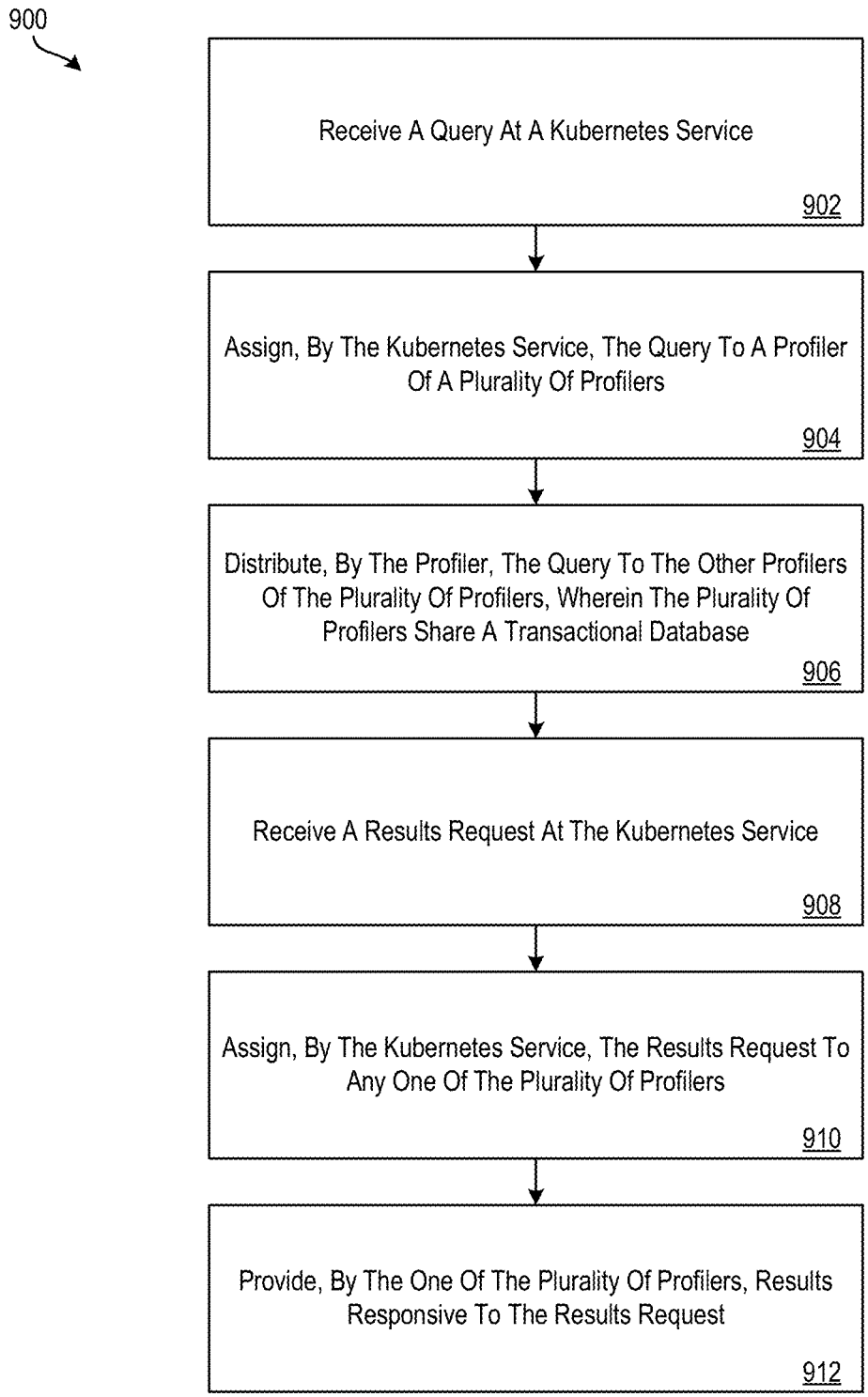
FIG. 9 depicts a flow diagram of a method for unified performance profiling of a workload according to one or more embodiments described herein.

FIG. 9 depicts a flow diagram of a method 900 for unified performance profiling of a workload according to one or more embodiments described herein. The method 800 can be performed by any suitable system or device, such as the computing environment 100, the system 500, and/or the like, including combinations and/or multiples thereof.

At block 902, the Kubernetes service (e.g., the Kubernetes service 506 of the system 500) receives a query (e.g., the query 502). At block 904, the Kubernetes service 506 assigns the query to a profiler (e.g., the profiler 302) of a plurality of profilers (e.g., the profilers 300). At block 906, the profiler distributes the query to the other profilers of the plurality of profilers. The plurality of profilers share a transactional database (see, e.g., FIG. 6).

At block 908, the Kubernetes service 506 receives a results request (e.g., results request 510). At block 910, the Kubernetes service assigns the results request to any one of the plurality of profilers. At block 912, the one of the plurality of profilers provides the results (e.g., as a flame graph) responsive to the results request.

Additional processes also may be included, and it should be understood that the process depicted in FIG. 9 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide for performance analysis and root cause identification for cloud computing. One or more embodiments utilize a library injection approach that injects libraries (e.g., Linux) libraries into profilers and relinks the libraries to the profiles to provide for executing the profilers using the libraries. Other example embodiments provide for distributing queries across profilers, for example using a transactional database, to provide a unified view across the profilers. Other example embodiments provide for generating interactive flamegraphs to display context-based information about root causes. As a result of these technical features and technical effects, system state information can be captured quickly (e.g., in a matter of seconds) and a "big picture" view of distributed software running on a cloud can be generated under a single unified view. This provides much faster and more thorough root cause analysis than conventional approaches. Further, one or more embodiments provide for improved root cause analysis by significantly reducing observability bias or profiling-hit to the running pod. It should be appreciated that the above examples of technical features, technical effects, and improvements to technology of example embodiments of the disclosure are merely illustrative and not exhaustive.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for unified performance profiling of a workload, the computer-implemented method comprising:
   in response to receiving a request against the workload in an environment comprising predetermined cloud-based containers, searching predetermined container runtime interface metadata across a plurality of compute nodes in the environment to locate runtime processes;
   selecting, for each runtime process located, a respective applicable profiler from a set of predetermined profilers sharing a transactional database;
   injecting, for each runtime process located, predetermined code libraries for each respective applicable profiler;
   re-linking the predetermined code libraries for each respective applicable profiler;

executing, for each runtime process located, each respective applicable profiler to produce a set of results.

2. The computer-implemented method of claim 1, wherein the predetermined code libraries comprises predetermined Linux libraries.

3. The computer-implemented method of claim 1, further comprising persisting the set of results in a repository.

4. The computer-implemented method of claim 1, further comprising generating, based on the set of results, a graphical interface, and displaying the graphical interface to a user.

5. The computer-implemented method of claim 4, wherein the graphical interface displays information about each respective applicable profiler.

6. The computer-implemented method of claim 5, wherein the graphical interface merges the information about each respective applicable profiler into unified data.

7. The computer-implemented method of claim 5, wherein the graphical interface further displays the information about an additional profiler.

8. The computer-implemented method of claim 1, wherein the respective applicable profiler is selected from a group consisting of a Node.js profiler, a Go profiler, a Python profiler, a Java profiler, a Rust profiler, a C profiler, a C++ profiler, and a Perl profiler.

9. A system comprising:
a memory comprising computer readable instructions; and
a processing device for executing the computer readable instructions, the computer readable instructions controlling the processing device to perform operations for unified performance profiling of a workload, the operations comprising:
in response to receiving a request against the workload in an environment comprising predetermined cloud-based containers, searching predetermined container runtime interface metadata across a plurality of compute nodes in the environment to locate runtime processes;
selecting, for each runtime process located, a respective applicable profiler from a set of predetermined profilers sharing a transactional database;
injecting, for each runtime process located, predetermined code libraries for each respective applicable profiler;
re-linking the predetermined code libraries for each respective applicable profiler;
executing, for each runtime process located, each respective applicable profiler to produce a set of results.

10. The system of claim 9, wherein the predetermined code libraries comprises predetermined Linux libraries.

11. The system of claim 9, further comprising persisting the set of results in a repository.

12. The system of claim 9, further comprising generating, based on the set of results, a graphical interface, and displaying the graphical interface to a user.

13. The system of claim 12, wherein the graphical interface displays information about each respective applicable profiler, wherein the graphical interface merges the information about each respective applicable profiler into unified data, and wherein the graphical interface further displays the information about an additional profiler.

14. A computer program product comprising a computer readable storage medium having program instructions embodied therewith, the program instructions executable by a processor to cause the processor to perform operations for unified performance profiling of a workload, the operations comprising:
in response to receiving a request against the workload in an environment comprising predetermined cloud-based containers, searching predetermined container runtime interface metadata across a plurality of compute nodes in the environment to locate runtime processes;
selecting, for each runtime process located, a respective applicable profiler from a set of predetermined profilers sharing a transactional database;
injecting, for each runtime process located, predetermined code libraries for each respective applicable profiler;
re-linking the predetermined code libraries for each respective applicable profiler;
executing, for each runtime process located, each respective applicable profiler to produce a set of results.

* * * * *